(12) United States Patent
Isaacson

(10) Patent No.: US 8,875,526 B1
(45) Date of Patent: Nov. 4, 2014

(54) TEMPERATURE AND HUMIDITY AIR TREATMENT SYSTEM

(76) Inventor: Roland H. Isaacson, Dunnellon, FL (US)

( * ) Notice: Subject to any disclaimer, the term of this patent is extended or adjusted under 35 U.S.C. 154(b) by 608 days.

(21) Appl. No.: 13/136,466

(22) Filed: Aug. 2, 2011

Related U.S. Application Data

(60) Provisional application No. 61/401,143, filed on Aug. 9, 2010.

(51) Int. Cl.
*F25D 17/06* (2006.01)

(52) U.S. Cl.
USPC ................................. 62/89; 62/272

(58) Field of Classification Search
CPC ........... F24F 1/04; F24F 3/153; F24F 3/1405; F24F 12/006; F25B 39/02
USPC ........... 62/90, 9, 173, 89, 272, 277, 404, 186, 62/63
See application file for complete search history.

(56) References Cited

U.S. PATENT DOCUMENTS

| | | | |
|---|---|---|---|
| 3,139,735 A | 7/1964 | Malkoff et al. | |
| 3,264,840 A | 8/1966 | Harnish | |
| 4,065,938 A | 1/1978 | Jonsson | |
| 4,480,684 A | 11/1984 | Onishi et al. | |
| 4,603,489 A * | 8/1986 | Goldberg | 34/77 |
| 4,706,739 A | 11/1987 | Noren | |
| 4,738,120 A * | 4/1988 | Lin | 62/272 |
| 4,898,234 A | 2/1990 | McGovern | |
| 5,065,586 A | 11/1991 | Shapiro-Baruch | |
| 5,088,295 A | 2/1992 | Shapiro-Baruch | |
| 5,598,887 A | 2/1997 | Ikeda et al. | |
| 6,237,357 B1 | 5/2001 | Hirao et al. | |
| 6,478,855 B1 | 11/2002 | Okanno | |
| 6,976,365 B2 | 12/2005 | Forkosh et al. | |
| 7,194,870 B1 | 3/2007 | O'Brien et al. | |
| 7,640,662 B2 | 1/2010 | Haglid | |
| 7,665,225 B2 * | 2/2010 | Goldberg et al. | 34/73 |
| 2006/0179676 A1 * | 8/2006 | Goldberg et al. | 34/77 |
| 2009/0100697 A1 * | 4/2009 | Steffens | 34/82 |
| 2009/0223077 A1 * | 9/2009 | Grunert et al. | 34/82 |

FOREIGN PATENT DOCUMENTS

JP     2005-5177224     * 7/2005

OTHER PUBLICATIONS

Abstract of JP 2005—177224 to Murayama Takuya.*
Translation for JP 2005-177224 to Murayama Takuya.*

* cited by examiner

*Primary Examiner* — Mohammad M Ali
(74) *Attorney, Agent, or Firm* — Richard John Bartz

(57) ABSTRACT

A temperature and humidity air treatment system for air directed to an enclosed environment has a heat exchanger joined with a water vapor remover having a phase change material to cool air and condense water vapor in the air and subsequently heat the cool air by absorbing heat from humid warm air flowing through the heat exchanger.

25 Claims, 4 Drawing Sheets

TEMPERATURE AND HUMIDITY AIR TREATMENT SYSTEM

CROSS REFERENCE TO RELATED APPLICATION

This application claims the benefit of the priority of U.S. Provisional Patent Application Ser. No. 61/401,143 filed Aug. 9, 2010.

FIELD OF THE INVENTION

The invention relates to temperature and humidity treatment of air for interior enclosures. A heat exchanger associated with water vapor remover reduces the temperature and humidity from air supplied to an interior environment.

BACKGROUND OF THE INVENTION

Comfort is a relative term that is different for virtually every individual because of sex, age, ethnicity, and activity level. Comfort is tied not only to the temperature but also to the relative humidity of an environment. Scientists have also found that a humidity level between 30 and 50 percent discourages many types of mold, dust mites, allergens, and certain bacteria. High humidity levels can cause condensation inside homes and human environmental discomfort.

Air conditioning and heating systems have been designed to remove humidity from the air. Many of these depended on reheating the cooled air either by use of additional heat from the oil or gas furnace or electric heat, both of which are cost prohibitive. Other approaches have included multiple evaporators and condensers but these were often difficult to control and required complex controls both for the temperature and the storage of refrigerant. A more common method of removing humidity with a separate dehumidifier which is independent of the air conditioner or heat pump.

There have also been attempts to reduce humidity by extending the cooling cycle after the thermostat has reached the preset cooling temperature. This is normally in conjunction with a reduction in the fan speed of the air handler motor. The reduction in fan air volume reduces the heating effect of the air passing over the evaporator which in turn lowers the temperature of the evaporator. The temperature reduction will be lowered to below the dew point temperature of the air and moisture from the air will condense on the coil thus reducing the humidity level of the interior enclosure. The current designs typically allow the temperature to be reduced below the set point of the thermostat by a preset amount thus cooling the space below that was desired. When the final temperature is reached, the unit will shut off and will not restart until cooling is called for. If the temperature inside the interior enclosure stays below the set point of the thermostat cooling is not called for and the humidity level can rise above the comfort level. This is the "clammy" or damp feeling often encountered in the Spring and Fall of the year.

Requirements by the United States Government have dictated that the efficiency of air conditioning equipment and heat pumps must meet or exceed a Seasonal Energy Efficiency Rating (SEER) of 13. Many of the manufacturers of air conditioning equipment have achieved this goal by increasing the size of both the evaporator and the condenser coils. This lowers the pressure differential across the compressor which results in less power consumption per BTU (British Thermal Unit). The increased size of the evaporator has reduced the ability of the air conditioning system to remove moisture from the air resulting in higher humidity levels. There are no federal energy saving or preserving requirements for dehumidifiers.

Phase change materials ("PCMs") have been made to provide enhanced thermal control by inhibiting flow of thermal energy until a latent heat of the PCMs is absorbed or released during a heating or a cooling process. The PCMs can be any substance or mixture of substances that has the capability of absorbing or releasing thermal energy by means of a phase change within a temperature change. A PCMs undergoes a transition between two states, e.g., liquid and solid states, liquid and gaseous states, solid and gaseous states, or two solid states. The PCMs can effectively be recharged by a source of heat or cold. PCMs are grouped into two categories: "Organic Compounds" including but not limited to propylene and ethylene glycoils, and "salt-based Products" including but not limited to Glauber's salt. PCMs available from Entropy Solutions, Inc of Minneapolis, Minn. have very high latent heat storage capabilities per unit volume. They are capable of storing and releasing a large amount of energy as they transition between states. The peak melt temperatures of these PCMs is between −35° F. to 304° F. The PCMs are contained as microcapsules, macrocapsules, flexible films, pipes, panels, and plastic spheres. Examples of phase change materials are disclosed by Simon A. H. Rose et al in United States Patent Application Publication 2009/0227451. G. J. Suppes in U.S. Pat. No. 6,574,971 disclose a method for producing PCMs containing fatty acids or fatty acid derivatives produced by biomass or livestock such as cattle. The thermal storage ability of these PCMs can be used to eliminate the need for air conditioning and to shift an air conditioning load to non-peak demand times. In use, air is directed from inside of a building to the PCM with a fan when the temperature of the air in the building is above the temperature at which the PCM undergoes a process through which it absorbs a significant latent heat thereby cooling the air flowing back to the building.

SUMMARY OF THE INVENTION

The invention is an air treatment system and method for regulating the temperature and humidity of air in an enclosed environment, such as a room, in a cost-effective manner. The humidity of the air is lowered to a level that provides a more comfortable environment for humans and animals. The low humidity level of air in the enclosed environment allows for elevated air temperatures that reduces air cooling energy costs. Also, the low humidity level of the air discourages molds, fungi, dust mites, fleas, cockroaches, allergens and bacteria. The humidity air treatment system comprises a heat exchanger for directing high temperature and humid air with high humidity content from an environment into a heat exchanger. The heat exchanger also discharges low humidity air from the heat exchanger into an enclosed environment, such as one or more rooms of a building. A water vapor remover is operable to cool air and condense water vapor from the humid air expelled from the heat exchanger. The water vapor remover has phase change materials, PCMs, that have the capability of absorbing or releasing thermal energy by means of a phase change within a temperature change. An example of a PCM from Entropy Solutions, Inc. is PCM type PT22 having a peak melt temperature of 54° F. and a latent heat of 80 BTU/lb. Other PCMs having peak melt temperatures of between 40° F. and 60° F. can be used in the water vapor remover. Other types of PCMs can be used with the water vapor remover to vary the PCMs' peak melt temperature and latent heat. Absorbents, such as silica gel or activated alumina, have microscopic pores capable of dehydrating air on physical contact can be used to remove water vapor from the air in the water vapor remover. As the water vapor is condensed, it cools the temperature of the air thereby increasing the humidity of the air in the water vapor remover. The air in the water vapor remover is transferred back to the heat exchanger. Once in the heat exchanger, the air is heated by absorbing heat from the high humidity air flowing in the heat exchanger. This lowers the humidity level and increases the temperature to a comfortable level of the air discharged from the heat exchanger into the enclosed environment. The lower humidity level of air in the interior environment allows for elevated air temperatures in the enclosed environment which reduces air cooling energy costs.

DESCRIPTION OF THE INVENTION

Figure 1:
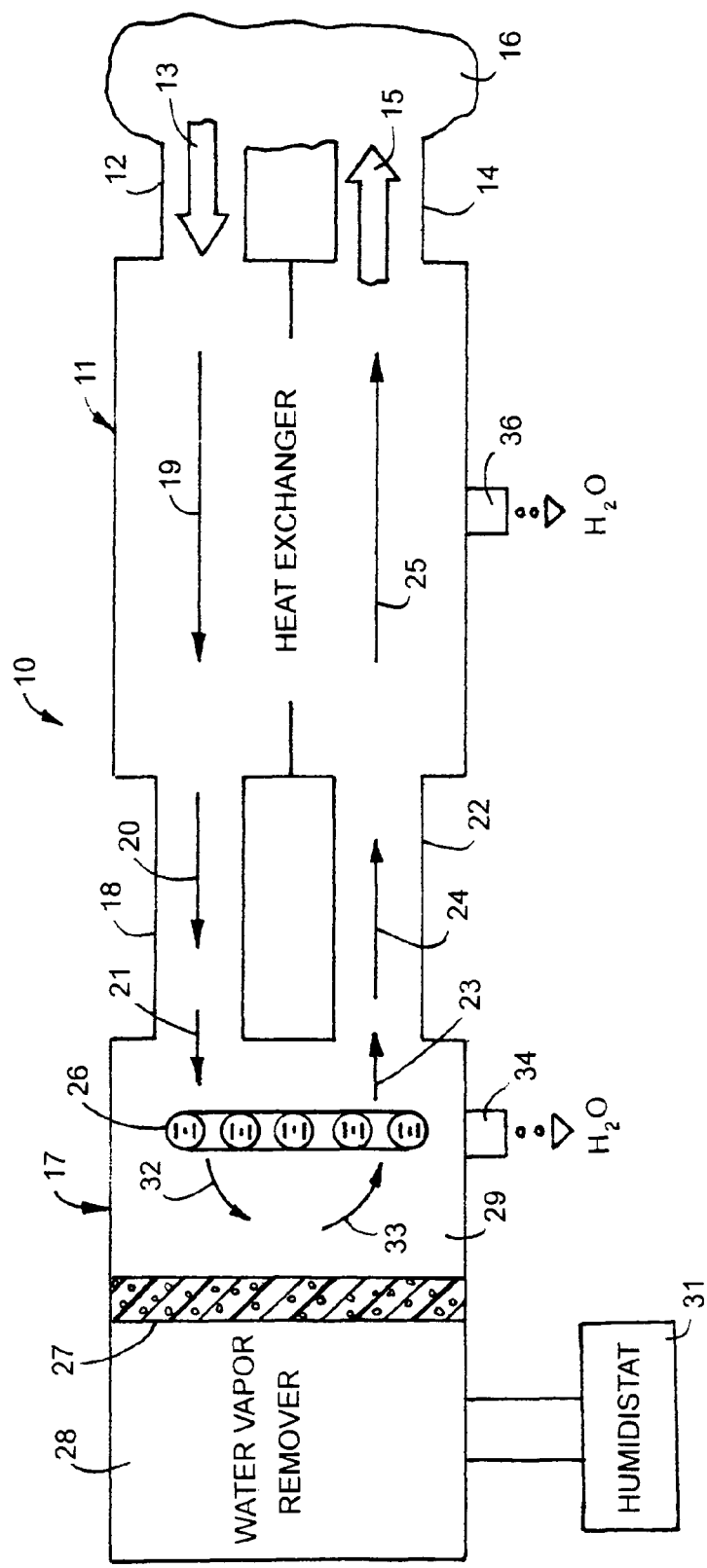
FIG. 1 is a diagram of a first embodiment of a combined water vapor remover and heat exchanger for controlling the temperature and humidity of air in an interior environment.

A first embodiment of the temperature and humidity air treatment system 10, shown in FIG. 1, has a heat exchanger 11 combined with a water vapor remover 17 operable to control the temperature and humidity of air in an interior environment or enclosure 16, such as a residential, an office room or other enclosed environments. Dampers can be used to control the flow of air into a plurality of interior environments. Heat exchanger 11 is a device designed for the efficient transfer of heat from one fluid to another fluid over a solid surface. The transfer of heat is in the form of absorption from warm air to cooled air to reduce atmospheric air temperature and humidity in interior enclosure 16. The atmosphere is a mixture of air and water vapor. When the atmosphere is cooled under constant total pressure, the air pressure remains constant until a dew point temperature is reached at which condensation of water vapor begins and the air temperature decreases. Relative humidity RH is the ratio of the actual water vapor pressure to the pressure of saturated water vapor at a prevailing air temperature. An example of a heat exchanger is disclosed by K. C. Haglid in U.S. Pat. No. 7,640,662 incorporated herein by reference. Other types of heat exchangers can be used to transfer heat from air flowing through the heat exchanger.

Heat exchanger 11 has an air intake or duct 12 in communication with interior enclosure 16 for allowing warm humid air to flow, as shown by arrow 13, from interior enclosure 16 into heat exchanger 11. Air duct 12 can be in communication with the outside or atmosphere whereby warm humid outside air flows into heat exchanger 11. The air flows out of heat exchanger 11 through an air exit or duct 14, shown by arrow 15, into interior enclosure 16. This air has low relative humidity RH when measured against air at relatively high temperatures, and is comfortable to humans and animals. The air flows from heat exchanger 11 to a water vapor remover 17 through a first duct 18 and out of water vapor remover 17 through a second duct 22 back to heat exchanger 11. Water from the condensed water vapor flows out of heat exchanger 11 through a drain 36. The air flow through water vapor remover 17 can flow from the bottom to the top of chamber 29.

Water vapor remover 17 is operable to receive moist air from heat exchanger 11. This air flows around coils 26 having phase change materials (PCMs) whereby the temperature of the air is decreased. The PCMs can be any substance or mixture of substances that has the capability of absorbing or releasing thermal energy by means of a phase change within a temperature change. The PCMs can be contained in microcapsules, microcapsules, films, pipes, tubes, panels and plastic spheres. An example of a PCM is a fatty acid or fatty acid derivative produced by biomass. An example of this PCM, available from Entropy Solutions, Inc, Minneapolis, Minn., is PCM type PT22 having a peak melt temperature of 54° F. and a latent heat of 80 BTU/lb. Other PCMs having peak melt temperatures of between 40° F. and 60° F. can be used in the water vapor remover. Other types of PCMs can be used with the water vapor remover to vary the PCMs' peak melt temperature and latent heat. Water can be a PCM for phase change to ice at 32° F. The PCMs are regenerated for subsequent use. The saturated vapor pressure of water decreases with decreasing temperature causing the water vapor to condense. The water flows out of water vapor remover 17 through drain 34. Water vapor remover can be a dehumidifier. An example of a dehumidifier is disclosed by T. S. O'Brien and D. S. Dingle in U.S. Pat. No. 7,194,870 incorporated herein by reference. Other types of dehumidifiers can be used to remove water vapor from air. Electronic dehumidifiers having peltier heat pumps that generate cool surfaces for condensing water vapor from air are also suitable for use with heat exchanger 11 to reduce humidity of air directed to interior enclosure. Alternatively, water vapor remover can be an air conditioner operable to cool air and condense water vapor.

Water vapor remover 17 includes a heat insulated interior wall 27 separating the air cooling coils chamber 29 from pump or blower chamber 28. Humidistat 31 wired to dehumidifier electric controls regulates the operation of dehumidifier 17. Humidistat 31 normally located in interior enclosure 16 is responsive to the relative humidity RH in interior enclosure 16. For example, when the relative humidity RH of the air in interior enclosure 16 is 60 percent or more humidistat 31 will turn water vapor remover ON whereby air having lower relative humidity RH is directed into interior enclosure 16 thereby reducing the level of the humidity in the air in enclosure 16.

Warm moist air 13 having high relative humidity RH is drawn into heat exchanger 19. The air as it flows through heat exchanger 11, shown by arrow 19, is cooled which increases the relative humidity RH. The air flows out of heat exchanger 11 into water vapor remover 17, shown by arrows 20 and 21, and around coils 26 containing chilled water, a refrigerant or a phase change material. The air heat is absorbed by the cool coils 26 and transferred to the chilled water, refrigerant, endothermic salts, or phase change materials (PCMs). The water vapor in the air flowing through water vapor remover 17, shown by arrows 32 and 33, is condensed to water which flows out of water vapor remover 17 through drain 34. The air flowing out of water vapor remover 17 is shown by arrows 23 and 24. The cool air flowing through heat exchanger 11, shown by arrows 25, cools the air flowing into heat exchanger 11, shown by arrow 13. The air in heat exchanger 11 is flowing in opposite directions or counter flowing as heat is transferred from air flowing into heat exchanger to air flowing out of heat exchanger 11. This increases the temperature of the air and lowers the humidity level of air flowing out of heat exchanger 11 into interior enclosure 16. When the humidity level of air within interior enclosure 16 is 50 percent or lower, the presence of molds, mildew, fungus, dust mites, fleas, cockroaches, allergens and bacterias is inhibited.

Figure 2:
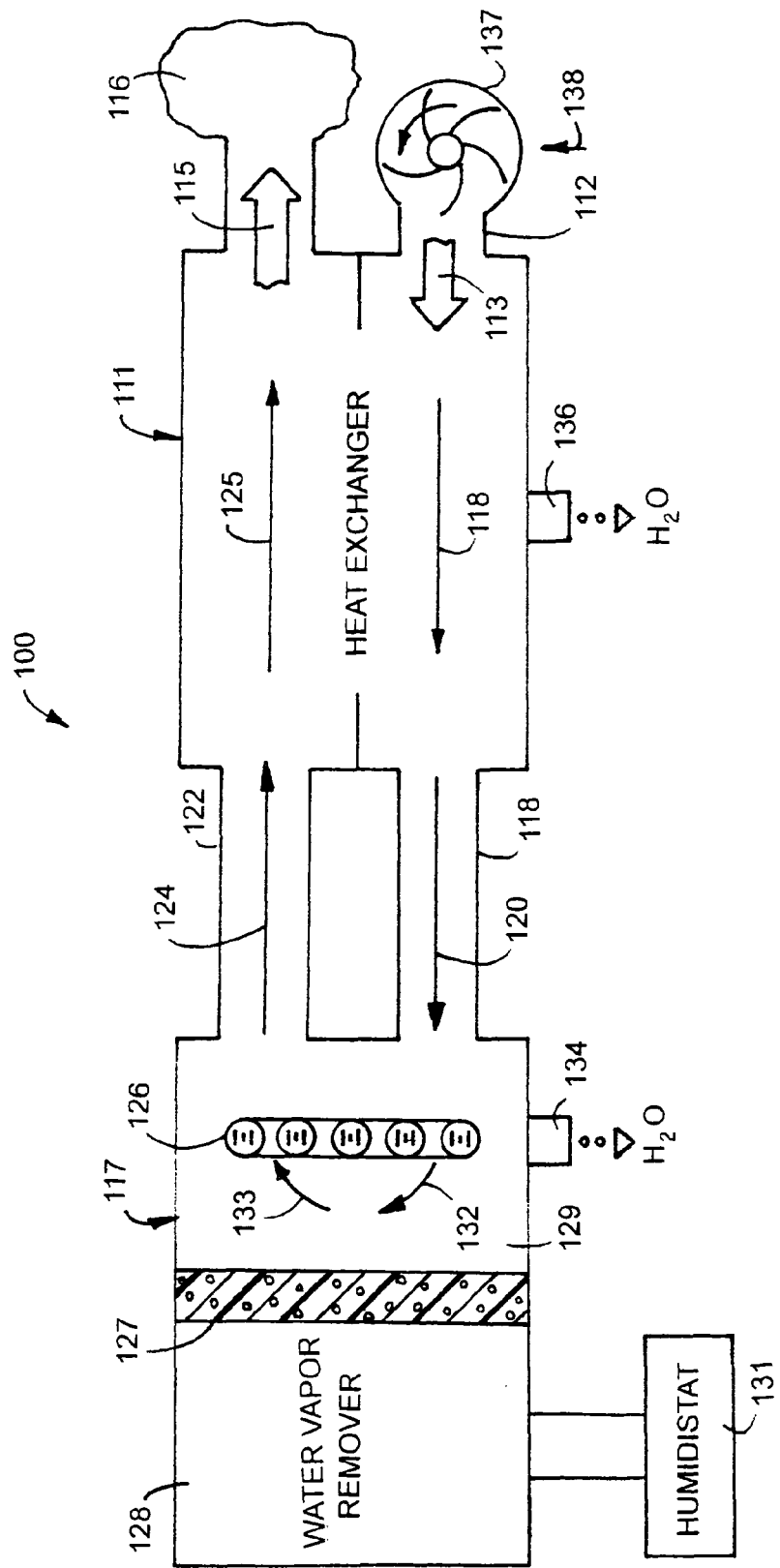
FIG. 2 is a diagram of a second embodiment of a combined water vapor remover and heat exchanger for controlling the temperature and humidity of air in an interior environment.

A second embodiment of the humidity air treatment system 100, shown in FIG. 2, has a heat exchanger 111 combined with a water vapor remover 117 to regulate the air temperature and humidity of the air within an interior environment or enclosure 116, such as one or more rooms of a building. Dampers can be used to control the flow of air into more than one interior environment. The parts and functions of heat exchanger 11 and water vapor remover 17 shown in FIG. 1 are applicable to system 100 and are incorporated herein. The parts of system 100 that correspond to system 10 have the same reference number with the prefix 1.

Heat exchanger 111 has an air inlet duct 112 that allows air to flow, shown by arrow 113, into heat exchanger 111. A motor driven blower 137 pumps atmospheric air shown by arrow 138 into heat exchanger 111. The motor can be wired to humidistat 131 whereby humidistat located in interior enclosure 116 controls the operation of the motor that drives blower 137 in response to the relative humidity RH of the air in interior enclosure 116. Blower 137 is operable to move outside ambient air 138 into heat exchanger 111. Blower 137 can be connected with a duct to interior enclosure 116 to allow blower 137 to move air out of interior enclosure 116 into heat exchanger 111. Blower 137 operates to move air through the heat exchanger 111 and vapor remover 117. The location of blower 137 can be associated with ducts 118 and 122 and other structures to achieve effective air flow through heat exchanger 111 and water vapor remover 117. Blower 137 moves air through heat exchanger, shown by arrow 119, and to water vapor remover 117, shown by arrow 120. The PCMs or refrigerant in coils 126 cools the air flowing through water vapor remover 117 and removes water vapor from the air. The PCMs can be the same PCMs used in the air treatment system disclosed in FIG. 1. Absorbents and endothermic salts can be included in the water vapor remover 117. The salts can be enclosed within a thermoplastic polyester elastomer container that allows air to flow through the container and salt therein and allows water to flow out of the container during drying of the salt. Atmospheric air during the day can be used to regenerate the salt. The air in the enclosed environment at night is subjected to the salt to remove water vapor from the air. The air in heat exchanger 111 is cooled by the air flowing out of heat exchanger 111, shown by arrow 125. Heat exchanger 111 is a counter flow heat absorption or assimilation device that transfers heat from warm intake air to exhaust air. The air flowing around coils 126 is further cooled which condenses the water vapor thereby changing the humidity of the air flowing out of water vapor remover 117, shown by arrow 124. The air flows from the bottom coils 126 to the top coils and back to heat exchanger 111. The humidity of the air is decreased as the air flowing through heat exchanger 111, shown by arrow 125, is heated by the warm air flowing into the heat exchanger 111.

Figure 3:
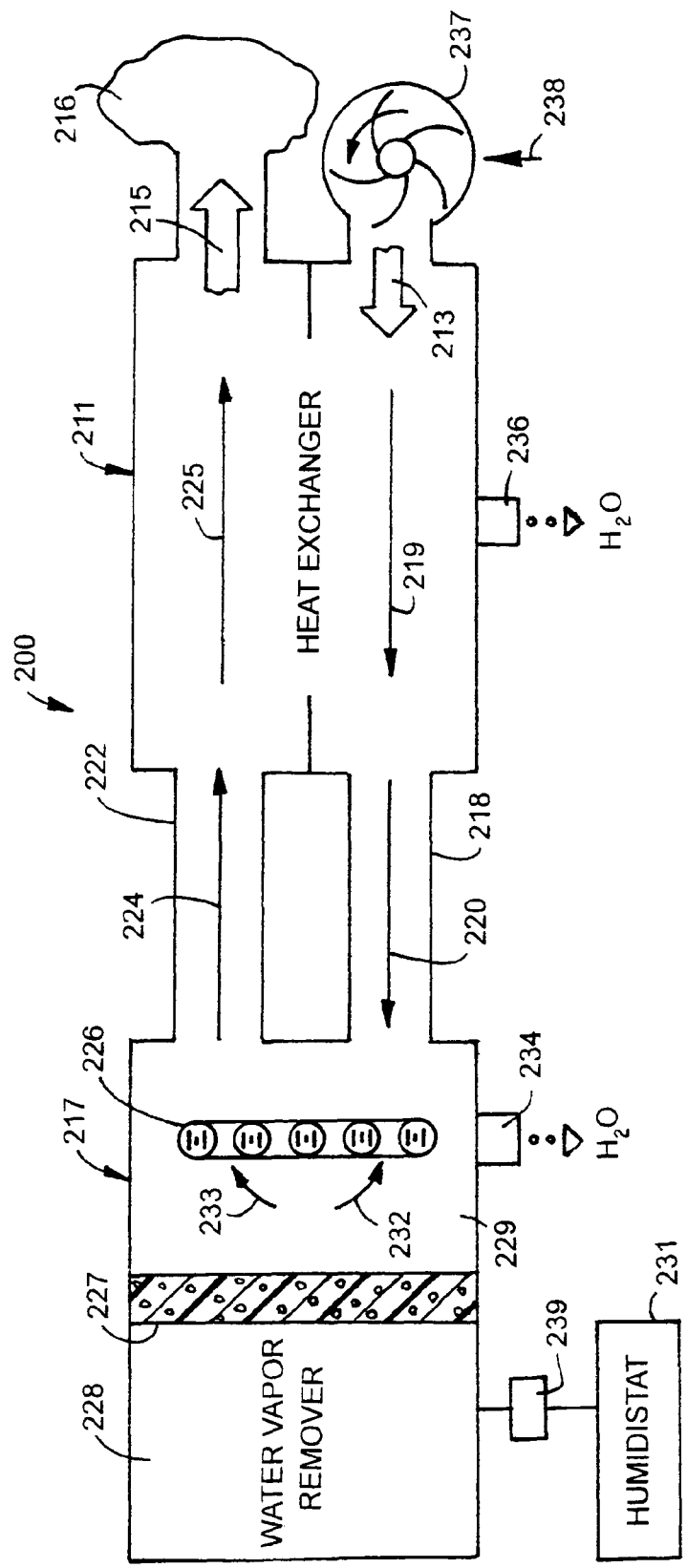
FIG. 3 is a diagram of a third embodiment of a combined water vapor remover and heat exchanger for controlling the temperature and humidity of air in an internal environment.

A third embodiment of the humidity air treatment system 200, shown in FIG. 3, has a heat exchanger 211 combined with a water vapor remover 217 to regulate the air temperature and humidity of the air within an interior environment or enclosure 216, such as one or more rooms of a building. The parts and functions of heat exchanger 11 and dehumidifier 17 shown in FIG. 1 are applicable to system 200 and as incorporated herein. The parts of system 200 that correspond to system 10 have the same reference numbers with the prefix 2.

A motor driven blower 237 operates to discharge warm atmospheric air 238 into heat exchanger 211, shown by arrow 213. Blower 237 can be located to move air from enclosed environment 216 to heat exchanger 211. Blower 237 can be placed in different locations and structures relative to heat exchanger 211 and water vapor remover 217 to achieve effective air flow through heat exchanger 211 and water vapor remover 217. The PCMs or refrigerant in coils 226 cools the air flowing through water vapor remover 217 and removes water vapor from the air. The PCMs can be the same PCMs used in the air treatment system disclosed in FIG. 1. The cooled air from water vapor remover 219 flowing through heat exchanger 211, shown by arrow 225, is heated to further reduce the humidity of the air flowing into the interior enclosure 216. Humidistat 231 is wired to a controller 239 such as an outdoor air temperature sensor which is operable to activate humidistat 231 in response to a selected atmospheric air temperature. Humidistat 231 then can activate water vapor remover 217 according to the selected humidity level of the air in interior enclosure.

Controller 239 can be a timer operable to activate water vapor remover 217 and blower 237 during selected time periods. For example, the water vapor remover 217 can be operated between 9 PM and 9 AM each day when the humidity of ambient air is above 72 percent.

Figure 4:
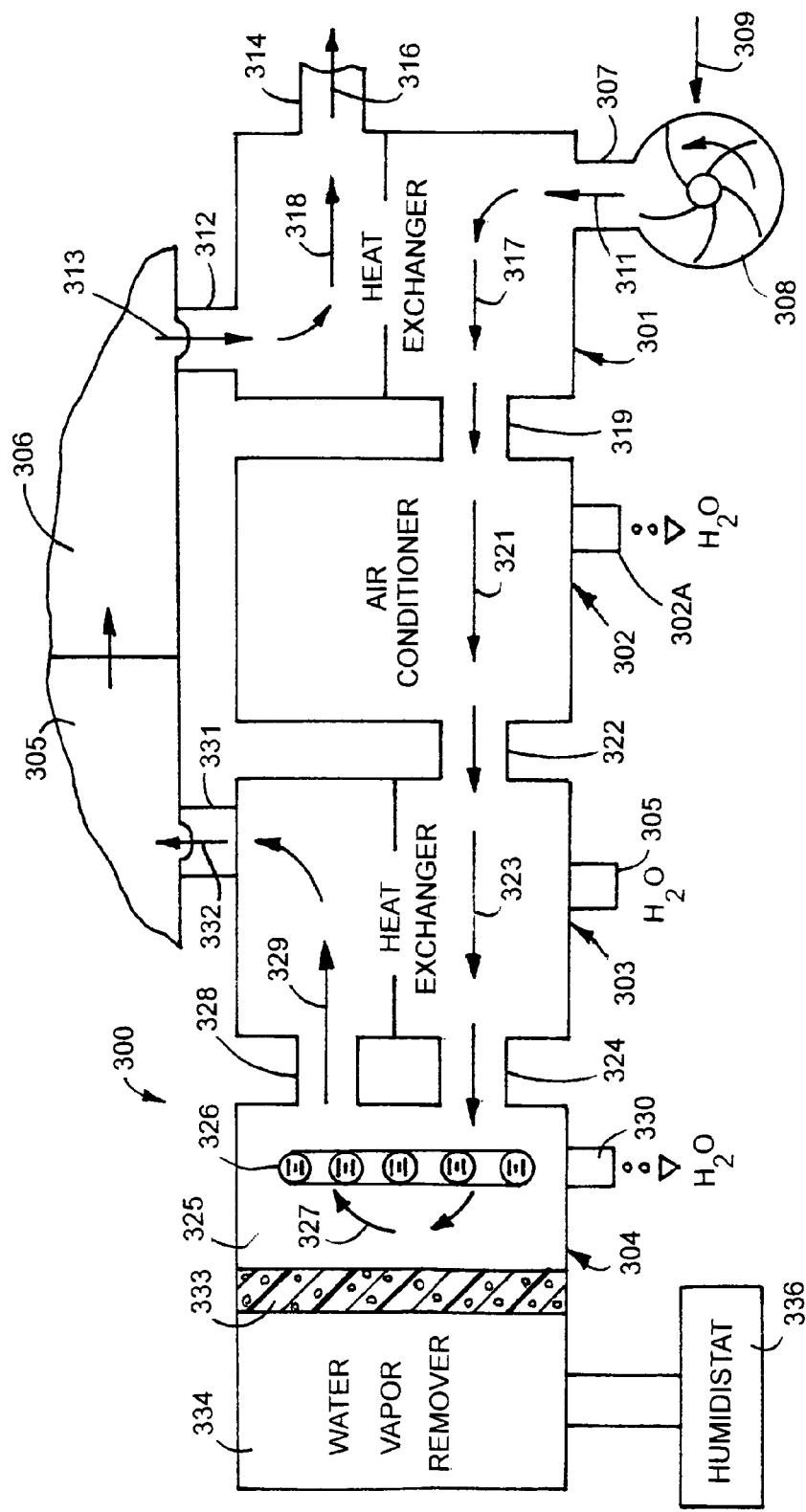
FIG. 4 is a diagram of a fourth embodiment of a combined water vapor remover, heat exchangers and air conditioner for controlling the temperature and humidity of air in an internal environment.

A fourth embodiment of the temperature and humidity air treatment system 300, shown in FIG. 4, functions to control the temperature and humidity of air directed into separate interior environments or enclosures 305 and 306, such as rooms in a building or other enclosed environments. Humidity air treatment system 300 comprises a first heat exchanger 301 for directing air to an air conditioner 302 having a drain 302A to allow water to flow out of air conditioner 302. Air flows from air conditioner 302 to a second heat exchanger 303 that directs air to a water vapor remover 304. Water vapor is removed from the air flowing in water vapor remover 304. The PCMs or refrigerant in coils 326 cools the air flowing through water vapor remover 304 and removes water vapor from the air. The PCMs can be the same PCMs used in the air treatment system disclosed in FIG. 1. Air is discharged from water vapor remover 304 back to the second heat exchanger 303. Air having lower humidity flows from the second heat exchanger 303 into one or more interior enclosures. Water flows out of heat exchanger 303 through drain 305.

Heat exchanger 301 is an air-to-air heat exchanger that cools atmospheric air with room exhaust air. Heat exchanger 301 includes a first air inlet 307 joined to a motor driven blower 308 operable to draw ambient air, shown by arrow 309, into blower 308 and discharge air, shown by arrow 311, into heat exchanger 301. Blower 308 can be used to move air from one or both enclosures 305 and 306, into heat exchanger 301. Blower 308 can be placed in different locations and structures relative to heat exchangers 301 and 303 and water vapor remover 304 to achieve effective air flow through heat exchangers 301 and 303, air conditioner 301 and water vapor remover 304. A second air inlet 312 coupled to interior enclosure 306 draws air, shown by arrow 312, from enclosure 306 into heat exchanger 301. The air flowing into and out of heat exchanger 301, shown by arrows 317 and 318, is counter flow or flowing in opposite directions to enhance the efficiency of heat transfer between the air flowing in heat exchanger 301. The air flows out of heat exchanger 301 through a second air outlet 319 to air conditioner 302. The air in air conditioner 302, shown by arrow 321, is further cooled by removing water vapor from the air which flows into drain 302A. This cooled air is directed through an air outlet 322 into second heat exchanger 303 water flows out of heat exchanger 303 through drain 305.

Second heat exchanger 303 is an air-to-air heat transfer device that functions to transfer heat from air in heat exchanger, shown by arrow 323, to air, shown by arrow 329, whereby air discharged through air outlet 331, shown by arrow 332, is heated and has a low humidity. This air is directed into interior enclosure 305. The air flowing in heat exchanger 303 flows in opposite directions to enhance the efficiency of heat transfer between the air in the heat exchangers. Absorbents and endothermic salts can be used to remove water vapor from the air in the water vapor remover. An example of a heat exchanger disclosed by T. McGovern and R. B. Whiteside in U.S. Pat. No. 4,898,234 is incorporated herein by reference. Other designs of heat exchangers can be used in humidity air conditioning system 300.

Air flows out of heat exchanger 303 through an air outlet 324 into water vapor remover 304 having a first chamber 325 containing a plurality of coils 326 accommodating chilled water, a refrigerant, or phase change material. Air, shown by arrows 327, flowing adjacent coils 326, condenses the water vapor in the air. Water flows out water vapor remover 304 through a drain 330. The cooled air flows into heat exchanger, shown by arrow 329. This air is heated to reduce its humidity by the transfer of heat from air flowing, shown by arrow 323, in heat exchanger 303.

Water vapor remover 304 can be a dehumidifier having a heat insulated interior wall 333 separating air cooling coils chamber 325 from pump or compressor chamber 334 to inhibit the transfer of heat from chamber 334 to chamber 325. Humidistat 336 wired to dehumidifier electric controls regulates the operation of water vapor remover 304. Humidistat 336 normally located in one of the interior enclosures is responsive to the relative humidity in the interior enclosure. For example, when the relative humidity of the air in the interior chamber is 60 percent or more humidistat 336 will turn water vapor remover and/or blower 3080N whereby air having lower relative humidity is directed into the interior enclosure thereby reducing the level of the humidity in the air in the interior enclosure. The air conditioner can be the water vapor remover.

There has been shown and described several embodiments of the humidity air treatment system of the invention. It is understood that changes and modifications in the heat exchangers air conditioner, water vapor remover and blower can be made by persons skilled in the art without departing from the invention which is defined in the following claims.

The invention claimed is:

1. A temperature and humidity air treatment system for air directed to an enclosed environment comprising:
a heat exchanger having an air inlet for directing warm high humidity air containing water vapor from an enclosed environment into the heat exchanger and an air outlet for directing low humidity air from the heat exchanger back into the enclosed environment,
an air mover associated with the heat exchanger operable to move air from the enclosed environment into the heat exchanger,
a water vapor remover operable to cool air and condense water vapor from the air in the water vapor remover,
an air conditioner positioned between the heat exchanger and water vapor remover operable to cool air flowing from the heat exchanger through the air conditioner and to the water vapor remover,
a humidistat operatively connected to the water vapor remover for controlling the operation of the water vapor remover in response to the humidity of the air in the enclosed environment,
a first conduit connected to the heat exchanger and air conditioner allowing air to flow from the heat exchanger into the air conditioner, said air in the air conditioner is changed to cooled air and the water vapor in the air is condensed, and
a second conduit connected to the water vapor remover allowing the cooled air to flow from the water vapor remover back into the heat exchanger, said cooled air being heated by the air flowing through the heat exchanger thereby heating the low humidity air discharged from the heat exchanger into the enclosed environment.

2. The air treatment system of claim 1 wherein:
said heat exchanger is a counter air flow heat exchanger for heating the cooled air in the heat exchanger with the high humidity air in the heat exchanger.

3. The air treatment system of claim 1 wherein:
the water vapor remover includes air cooling coils for conducting heat from air in the water vapor remover and condensing water vapor from the air.

4. The air treatment system of claim 3 wherein:
the coil contains phase change materials.

5. The air treatment system of claim 4 wherein:
the phase change materials have a peak melt temperature of between 40° F. and 60° F.

6. The air treatment system of claim 1 including:
a timer operatively connected to the water vapor remover operable to operate the water vapor remover during selected time periods.

7. The air treatment system of claim 1 including:
an air temperature sensor for sensing the temperature of ambient air operatively connected to the water vapor remover for controlling the operation of the water vapor remover.

8. The air treatment system of claim 1 wherein:
the air mover includes a blower operable to direct the warm high humidity air into the heat exchanger, air conditioner and water vapor remover.

9. A temperature and humidity air treatment system for air directed to an enclosed environment comprising:
a first heat exchanger having an air inlet for directing warm high humidity air containing water vapor into the first heat exchanger and an air outlet for directing low humidity air from the first heat exchanger into an enclosed environment,
an air mover operable to move the warm high humidity air into the first heat exchanger,
a second heat exchanger having an air inlet and an air outlet,
an air conditioner for receiving air from the first heat exchanger and directing cooled air to the second heat exchanger, and
a water vapor remover operable to receive air from the second heat exchanger, cool air and condense water vapor from the air in the water vapor remover and direct the cool air back to the second heat exchanger, said cool air in the second heat exchanger heating the air flowing out of the second heat exchanger through the air outlet of the second heat exchanger into the enclosed environment.

10. The air treatment system of claim 9 including:
a humidistat operatively connected to the water vapor remover for controlling the operation of the water vapor remover in response to the humidity level of the air in the enclosed environment.

11. A temperature and humidity air treatment system for air in an enclosed environment comprising:
a heat exchanger having an air inlet for directing warm high humidity air containing water vapor from an environment into the heat exchanger and an air outlet for directing low humidity air from the heat exchanger into an enclosed environment,
an air mover associated with the heat exchanger operable to move air into the heat exchanger,
a heat exchanger for directing warm high humidity air containing water vapor from an environment into the heat exchanger and discharging low humidity air from the heat exchanger back into an enclosed environment,
a water vapor remover operable to cool air and condense water vapor from the air in the water vapor remover,
an air conditioner positioned between the heat exchanger and water vapor remover operable to cool air flowing from the heat exchanger through the air conditioner and into the water vapor remover, and
an air passage from the water vapor remover to the heat exchanger allowing cooled air to flow from the water vapor remover back into the heat exchanger, said cooled air being heated by the air flowing from the environment through the heat exchanger flows into the enclosed environment.

12. The air treatment system of claim 11 wherein:
said heat exchanger is a counter air flow heat exchanger for heating the cooled air in the heat exchanger with the air flowing from the environment through the heat exchanger.

13. The air treatment system of claim 11 wherein:
the water vapor remover includes a water vapor remover having air cooling coils for conducting heat from air in the water vapor remover and condensing water vapor from the air.

14. The air treatment system of claim 13 wherein:
the water vapor remover comprises a dehumidifier having an interior insulation wall separating the interior of the water vapor remover into two chambers, said cooling coils being located in one of said chambers.

15. The air treatment system of claim 11 wherein:
said water vapor remover includes at last one phase change material for absorbing and releasing thermal energy to cool air in the water vapor remover and removes water vapor from the air in the water vapor remover.

16. The air treatment system of claim 14 wherein:
the phase change material has a peak melt temperature of between 40° F. to 60° F.

17. The air treatment system of claim 11 including:
a humidistat operatively connected to the water vapor remover for controlling the operation of the water vapor remover in response to the humidity level of the air interior environment.

18. The air treatment system of claim 17 including:
a timer operatively connected to the water vapor remover operable to operate the water vapor remover during selected time periods.

19. The air treatment system of claim 17 including:
an air temperature sensor for sensing the temperature of ambient air operatively connected to the water vapor remover for controlling the operation of the dehumidifier.

20. The air treatment system of claim 11 wherein:
said air mover is a blower connected to the heat exchanger operable to direct the high humidity air from the environment into the heat exchanger.

21. A method regulating the temperature and humidity of air in an enclosed environment comprising:
moving warm high humidity air containing water vapor from an environment into a first heat exchanger,
cooling the air in the first heat exchanger,
directing the air containing water vapor from the first heat exchanger to an air conditioner,
cooling the air containing water vapor and removing the water vapor from the air in the air conditioner,
moving the air from the air conditioner into a second heat exchanger,
cooling the air and removing water vapor from the air in the second heat exchanger,
directing the air in the second heat exchanger to a water vapor remover,
cooling the air and removing water vapor from the air in the water vapor remover,
directing the cooled air from the water vapor remover back to the second heat exchanger,
heating the cooled air in the second heat exchanger with the air in the second heat exchanger to provide low humidity air, and
discharging the low humidity air from the second heat exchanger to an enclosed environment.

22. The method of claim 21 wherein:
the high humidity air containing water vapor is drawn from an enclosed environment into the first heat exchanger.

23. The method of claim 21 including:
blowing air containing water vapor through the first heat exchanger, air conditioner, second heat exchanger and water vapor remover.

24. The method of claim 21 including:
using at least one phase change material to cool the high humidity air containing water vapor and remove the water vapor from the air in the water vapor remover.

25. The method of claim 24 wherein:
the phase change material has a peak melt temperature of between 40° F. and 60° F.

* * * * *